B. P. COOPER.
VEHICLE WHEEL.
APPLICATION FILED AUG. 27, 1907.
946,112.
Patented Jan. 11, 1910.
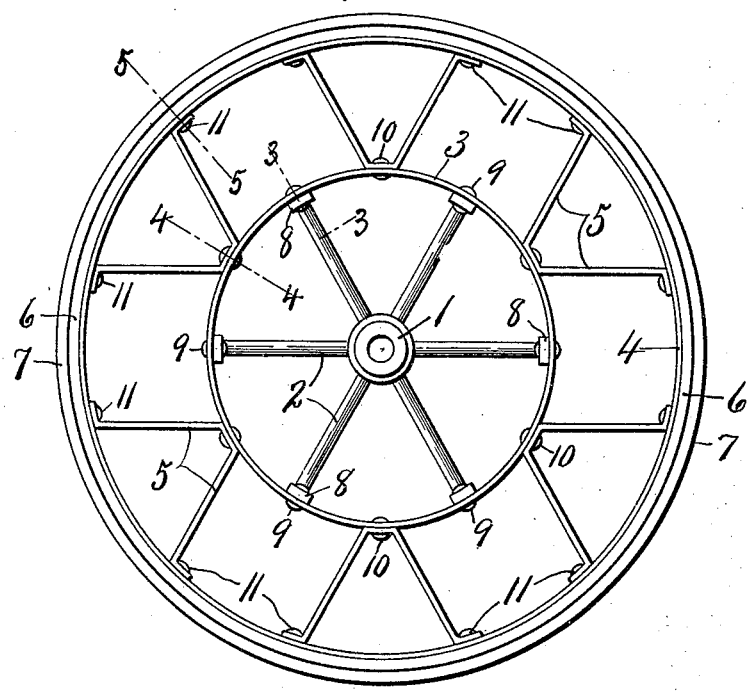
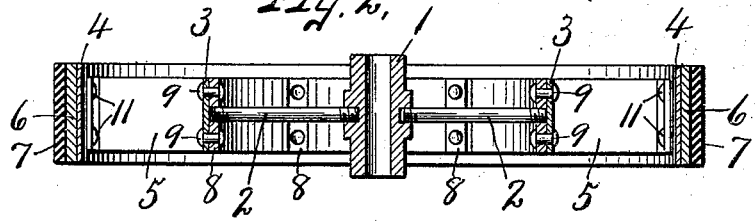
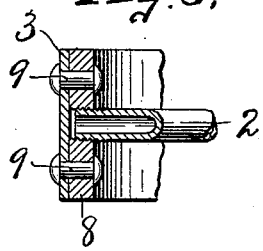 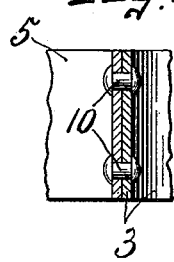 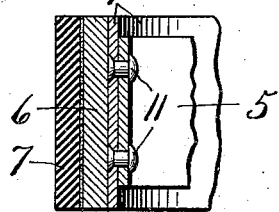
Witnesses.
A. C. Thomas
H. E. Chase
Inventor.
Benson P. Cooper
By
Howard P. Denison
Attorney.

UNITED STATES PATENT OFFICE.

BENSON P. COOPER, OF ITHACA, NEW YORK.

VEHICLE-WHEEL.

946,112.  Specification of Letters Patent.  Patented Jan. 11, 1910.

Application filed August 27, 1907. Serial No. 390,397.

*To all whom it may concern:*

Be it known that I, BENSON P. COOPER, of Ithaca, in the county of Tompkins, in the State of New York, have invented new and useful Improvements in Vehicle-Wheels, of which the following, taken in connection with the accompanying drawings, is a full, clear, and exact description.

This invention relates to certain improvements in vehicle wheels involving the use of a radially resilient band or annulus interposed between and concentric with the hub and rim of the wheel and connected to said hub and rim by separate intervening series of spokes, those of the outer series being staggered with those of the inner series to afford the desired resilience or radial compression under a load or in passing over obstructions and uneven surfaces.

My main object is to provide a simple, practical and economic vehicle in which the radial compression strains upon the rim, under load, are transmitted to an inner concentric spring ring or band which is held in place against lateral or torsional strains by a series of intervening spokes between said resilient band and the hub of the wheel. In other words, I have sought to obtain the desired resiliency by providing the hub with a series of rigid spokes having their outer ends united by a tempered spring annulus or band and supporting the outer rim by intervening spokes or braces which are secured to the inner spring band or annulus substantially midway between the outer ends of inner spokes.

Other objects and uses relating to the specific arrangement of the concentric rims or bands and spokes will be brought out in the following description.

In the drawings—Figure 1 is a side elevation of a vehicle-wheel embodying the various features of my invention. Fig. 2 is a diametrical sectional view of the wheel seen in Fig. 1. Fig. 3, 4, and 5 are enlarged sectional views taken respectively on lines 3—3, 4—4, and 5—5, Fig. 1.

As shown in the drawings, this wheel comprises a hub —1—, a series of radiating spokes —2— secured to the hub, a radially resilient band or annulus —3— secured to the outer ends of the spokes concentric with the hub —1—; a rim —4— which is connected to the resilient band —3— by a second series of spokes —5—; a wood felly —6— secured to the rim —4— and a rubber tire —7— secured to the periphery of the felly —6—.

The hub —1— may be of any suitable construction adapted to receive and rigidly retain the spokes —2— in fixed relation thereto, said spokes being of uniform length and although they may be made of any rigid material capable of resisting radial strains, they are in this instance, preferably made of light steel tubing having their outer ends provided with suitable seats —8— for the resilient band —3—, the outer ends of the spokes being spaced equidistant apart sufficient to permit radial compression or resilient action of the intervening portions of the spring-band —3—. This spring-band —3— may be made of any resilient material, but is preferably made of flat tempered spring steel of suitable transverse width to form a comparatively broad bearing for the outer series of spokes —5— for the purpose of more positively resisting lateral or torsional strains upon the outer rim and keeping all parts of the rim in the same circular plane, said spring-band being secured to the seats —8— by suitable fastening means, as rivets or bolts —9—. The outer spokes —5— preferably consist of V-shaped metal bars having their apexes substantially flat and secured by rivets —10— to the periphery of the band —3— substantially midway between the outer ends of the spokes —2—, while the outer ends of said bars —5— which are divergent are secured by rivets —11— to the inner face of the rim —4—. The outwardly divergent arms of each spoke —5— are, therefore, tangential to a circle between and concentric with the hub —1— and spring-band —3—, which relieves, in a measure, direct radial thrust upon the resilient portions of the band —3— between the spokes and tends to more evenly distribute such radial strains when pressure is applied to the outer rim or tire at the junction with the arms of the spokes —5—. This divergent arrangement of the arms of the outer series of spokes so as to bring them tangential to a circle between the hub and spring-band —3— relieves the outer spokes from direct end thrust, and when these arms are made sufficiently light, affords a certain degree of resiliency in addition to that afforded by the spring-band —3—.

The same fastening means which secure the outer ends of the spokes —5— to the rim —4— may also be utilized to secure the felly —6— to the rim, or such felly may be secured by separate means and may be of any desired construction to receive and retain the tire —7— thereon, although in the present instance, I have shown the rim and tire as flat transversely, the latter being adapted to be secured by any cementitious or other fastening means.

It will be observed that in the structure shown in Fig. 1, the adjacent arms of the spokes are substantially parallel, and while this is the preferred construction, the essential feature of the invention lies in arranging the inner and outer series of spokes relatively to the inner spring metal band in such manner that the outer series of spokes are supported substantially midway between the outer ends of the inner spokes and are rigidly secured to and support the outer rim; that is, the outer rim is supported through the medium of the spokes —5— upon the resilient portions of the spring-band —3— midway between the outer ends of the spokes —2—, and at the same time in the construction shown in Fig. 1, sufficient space is left between the outer ends of the spoke-arms of the spokes —5— to permit a limited radial compression of the rim and parts mounted thereon.

The particular feature of the invention, however, lies in transmitting all radial thrust upon the tire and rim directly to the resilient portions of the spring-band —3—, which in this instance, is disposed substantially midway between the hub and outer rim so that the portions of the band —3— bridging the space between the outer ends of the spokes is comparatively long, thereby adding to the resiliency of the spring-band at its junction with the spokes —5—.

The construction of spokes —5— is such that any pressure or load applied to the tire between the arms of the spokes is transmitted to the yielding portions of the spring-band —3— in nearly radial lines, and the only object in arranging the arms of such spokes tangential to a circle between the hub —1— and band —3— is to relieve the strain upon such spokes when the inward pressure is applied at the junction of said spoke-arms with the rim, in which case, such end-thrust is instantly transmitted to the yielding portions of the spring-band —3—, but at the same time, the arms of the spokes —5— may have a slight inherent resiliency.

What I claim is:

A vehicle wheel comprising a hub and rigid tubular radiating spokes of equal length and having their outer ends spaced a uniform distance apart and provided with seats, a spring metal annulus concentric with the hub, said seats equally spaced apart and of the same width as said annulus and mounted upon the inner periphery thereof, the outer ends of said spokes screw-threaded into said seats, a rim, said annulus positioned semi-distant between the rim and hub, and double spoke-arms rigidly connecting equally spaced points upon the rim to said annulus at points on the latter mid-way between said seats.

In witness whereof I have hereunto set my hand this 30th day of June 1907.

BENSON P. COOPER.

Witnesses:
  CHAS. G. HOYT,
  J. F. HAWKINS.